United States Patent [19]
Kyriakou

[11] 3,819,193
[45] June 25, 1974

[54] QUICK SPLIT ARBOR

[76] Inventor: George S. Kyriakou, 99-42 41 Ave., Corona, N.Y. 11368

[22] Filed: Jan. 17, 1973

[21] Appl. No.: 324,370

[52] U.S. Cl................................ 279/2 R, 242/72.1
[51] Int. Cl........................................... B23b 31/42
[58] Field of Search .............. 242/72.1; 279/2, 1T, 279/156, 1 C; 82/44

[56] References Cited
UNITED STATES PATENTS
1,267,146   5/1918   Tripp.................................. 279/1 T
2,601,419   6/1952   Spahn..................................... 279/2

*Primary Examiner*—Francis S. Husar
*Attorney, Agent, or Firm*—Carl Miller

[57] ABSTRACT

An improved arbor having a novel means for securely holding a work in a lathe or other machine, in a quicker manner without necessity of using a chuck wrench, set screw or nut; the device consisting of an arbor member securable at one end in a machine chuck, the other end having a removable split chuck member receivable into a central opening of the work and which is readily expandable therewithin for holding thereto.

3 Claims, 7 Drawing Figures

PATENTED JUN 25 1974 3,819,193

QUICK SPLIT ARBOR

This invention relates generally to machine arbors.

A principle object of the present invention is to provide an improved arbor for supporting a work while it is being turned in a lathe, screw machine or the like, and which allows a quicker and easier securement and release thereof from the arbor so to speed up production.

Another object is to provide an arbor which incorporates a split chuck that is expandable so to grasp a work when inserted into a central opening of the work.

Another object is to provide a new quick split arbor wherein the chuck is expandable when the work mounted thereupon is turned in a clockwise direction, so to hold the work, and wherein the chuck is retractable when the work is turned in a counter clockwise opposite direction, so to allow removal of the work from the chuck, thus eliminating the necessity of employing any chuck wrench, and thus save time by such tool handling during mass production.

Other objects are to provide a Quick Split Arbor which is simple in design, inexpensive to manufacture, rugged in construction, easy to use and efficient in operation.

These and other objects of the invention will appear from the following specification, it being understood that modifications, variations, and adaptations may be made within the scope of the appended claims.

Figure 1:
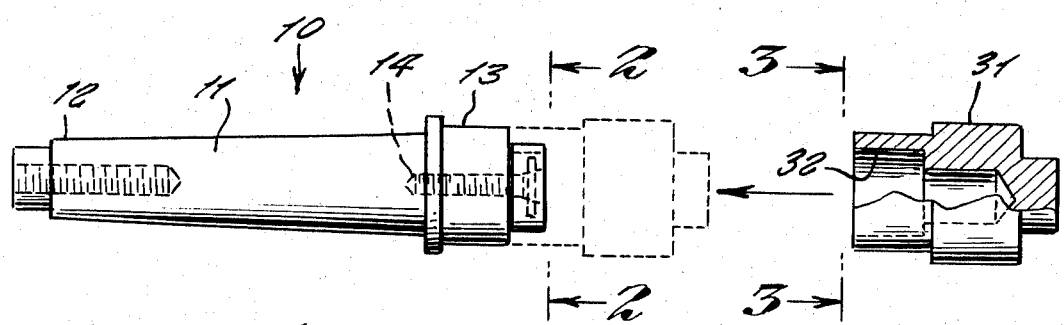
FIG. 1 is a side view of the invention.
Figure 2:
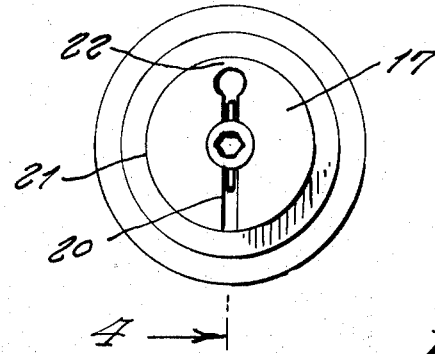
FIG. 2 is a view in direction 2—2 of FIG. 1.
Figure 3:
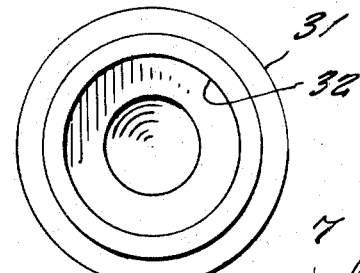
FIG. 3 is a view in direction 3—3 of FIG. 1.

Referring now to the drawing in detail, and more particularly to FIGS. 1 through 5 at this time, the reference numeral 10 represents a quick split arbor according to the present invention wherein there is an arbor member 11 which at one end 12 is receivable secured into a lathe chuck and firmly secured therein by a chuck wrench.

The opposite end 13 of the arbor member 11 has a threaded opening 14 that engages a screw 15 having a conical head 16.

A split collar 17 has a central opening 18 which includes a conical shoulder 19 for abutment with the conical screw head 16. A diametrically extending cross slot 20 across the opening 18 starts at one end on the edge 21 of the collar and stops short of the edge on the opposite side so that a narrow bridge portion 22 is retained on the collar, such portion being sufficiently narrow so to allow the opposite ends 23, thus formed, to be slightly spread apart by the flexing of portion 22.

The screw 15 includes cross arms 24 extending from opposite sides of the conical side of the screw head; the arms being receivable within the cross slot 20.

Figure 6:
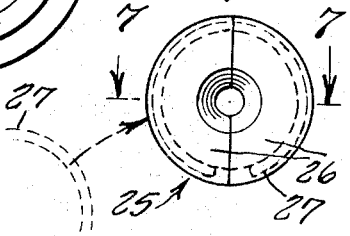
FIG. 6 is a side view of a modified design of the invention.
Figure 4:
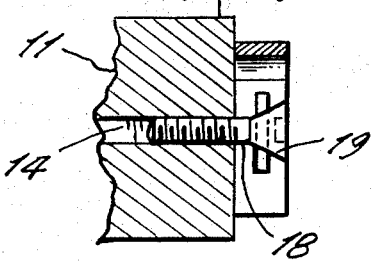
FIG. 4 is a cross-section on line 4—4 of FIG. 2.
Figure 7:
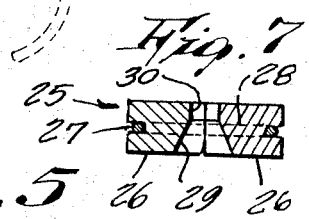
FIG. 7 is a cross-section on line 7—7 of FIG. 6.
Figure 5:
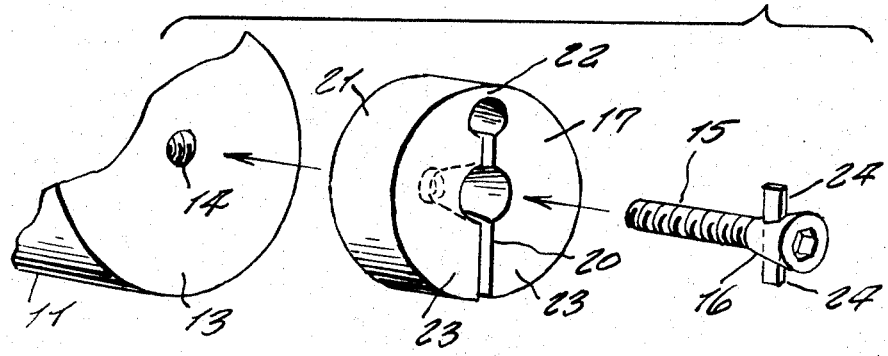
FIG. 5 is a perspective view of the invention parts in related positions.

In FIGS. 6 and 7, a modified design of the invention provides a modified collar 25 formed to two like halves 26 which are held together by a snap ring 27 fitted in an annular groove 28 around the outer circular edge of the halves, and which allows the halves to be spread apart by the conical head of the screws bearing against a conical shoulder 29 of a central opening 30 of the halves.

In operative use, it is now evident, that when a work 31 (having a central opening 32 that is slide fit on the collar) is thus placed thereupon, and turned clockwise the slight frictional engagement causes the work to turn the collar which in turn causes the screw to rotate due to the cross arms held in the cross slot. This makes the screw to move axially deeper into the end of the arbor member, so that the screw conical head bears against the conical shoulder of the collar, so to cause the collar to expand so to firmly grasp the work. Thus the work is secured for machining. To remove the work thereafter, the work is simply given a counter-clockwise turn thus reversing the process above described. The firm grasp and quick release is attained without need of a chuck wrench.

While the above description indicates the present invention applied to production machinery, such as lathes, grinders or drill presses, it should be understood that the invention may be readily incorporated in other fields of utility as well, such as plumbers employing it as a cap for pipes to stop running water. In the sport of fishing, it can be utilized to hold a fishing pole together which is made of separate sections, and prevent the pole from falling apart. In bottle closures, it can form a cork to prevent leaking of bottle content therethrough. In camping equipment, it can serve to hold tent pole sections together similarly to the fishing pole just mentioned. In a similar manner it can be applied to beach umbrella poles made of sections. A simple thrust one way locks them together, and a thrust the other way disassembles them.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. In a quick split arbor the combination of an arbor member which at one end supports an expandable collar that is expandable when turned in one direction, and compressible when turned in an opposite direction, wherein a threaded opening in said arbor member end engages a screw having a conical head having transverse cross arms extending therefrom, and wherein said collar has a central opening which includes a conical shoulder to engage said conical head.

2. The combination as set forth in claim 1 wherein said collar comprises a circular member with a diametrical extending cross slot which at one end opens out on the edge of said collar and which at its other end is short of contacting said edge so to form a narrow flexible bridge between opposite ends of said collar.

3. The combination as set forth in claim 2 wherein said cross arms rest within said cross slot.

* * * * *